United States Patent
Park et al.

(10) Patent No.: US 8,804,013 B2
(45) Date of Patent: Aug. 12, 2014

(54) METHOD OF CALCULATING LENS SHADING COMPENSATION FACTOR AND METHOD AND APPARATUS FOR COMPENSATING FOR LENS SHADING BY USING THE METHOD

(75) Inventors: Soo Jin Park, Seoul (KR); Deepak Chandra Bijalwan, Bangalore (IN); Raghubansh B. Gupta, Bangalore (IN)

(73) Assignee: LG Innotek Co., Ltd., Seoul (KR)

( * ) Notice: Subject to any disclaimer, the term of this patent is extended or adjusted under 35 U.S.C. 154(b) by 482 days.

(21) Appl. No.: 13/181,783

(22) Filed: Jul. 13, 2011

(65) Prior Publication Data

US 2013/0002912 A1    Jan. 3, 2013

(30) Foreign Application Priority Data

Jun. 29, 2011   (KR) .................. 10-2011-0063821

(51) Int. Cl.
*H04N 9/64*   (2006.01)
*H04N 5/20*   (2006.01)

(52) U.S. Cl.
USPC .......................................... 348/251; 382/274

(58) Field of Classification Search
USPC ............. 348/229.1, 230.1, 251, 334; 382/274
See application file for complete search history.

(56) References Cited

U.S. PATENT DOCUMENTS

| | | | | |
|---|---|---|---|---|
| 5,912,992 | A * | 6/1999 | Sawada et al. | 382/274 |
| 8,055,089 | B2 * | 11/2011 | Ok et al. | 382/255 |
| 2003/0026494 | A1 * | 2/2003 | Woodell et al. | 382/260 |
| 2004/0114826 | A1 * | 6/2004 | Bhattacharjya | 382/274 |
| 2004/0114827 | A1 * | 6/2004 | Chizawa et al. | 382/274 |
| 2006/0222260 | A1 * | 10/2006 | Sambongi et al. | 382/274 |
| 2007/0009173 | A1 * | 1/2007 | Wakabayashi | 382/274 |
| 2007/0242897 | A1 * | 10/2007 | Bushell et al. | 382/274 |
| 2008/0199074 | A1 * | 8/2008 | Mitsunaga | 382/169 |
| 2008/0259186 | A1 * | 10/2008 | Wang et al. | 348/238 |
| 2009/0067744 | A1 * | 3/2009 | Kawanishi et al. | 382/274 |
| 2009/0268053 | A1 * | 10/2009 | Wang et al. | 348/229.1 |

* cited by examiner

*Primary Examiner* — Twyler Haskins
*Assistant Examiner* — Dwight C Tejano
(74) *Attorney, Agent, or Firm* — Saliwanchik, Lloyd & Eisenschenk

(57) ABSTRACT

Provided is a method of calculating a compensation factor to compensate for lens shading due to the characteristics of an image capturing device, which requires a small amount of memory. A reference image is captured, and a compensation factor is calculated using the characteristics of a lens shading pattern of the captured reference image. A distribution of pixel values is approximated using an exponential spline function, and a compensation factor is calculated using the approximated distribution. In addition, a method and an apparatus for compensating for lens shading by using a calculated compensation factor are provided.

17 Claims, 13 Drawing Sheets

ORIGINAL HORIZONTAL PROFILE AND FINAL
CORRECTED HORIZONTAL PROFILE

FIRST ORDER EXPONENTIAL SPLINE FUNCTION

SECOND ORDER EXPONENTIAL SPLINE FUNCTION

METHOD OF CALCULATING LENS SHADING COMPENSATION FACTOR AND METHOD AND APPARATUS FOR COMPENSATING FOR LENS SHADING BY USING THE METHOD

CROSS-REFERENCE TO RELATED APPLICATION

This application claims the benefit under 35 U.S.C. §119 to Korean Patent Application No. 10-2011-0063821, filed Jun. 29, 2011, which is hereby incorporated by reference in its entirety.

BACKGROUND

The present disclosure relates to a method of compensating for lens shading, and more particularly, to a method of calculating a compensation factor to compensate for lens shading due to the characteristics of an image capturing device, which requires a small amount of memory. According to an embodiment, a white image is captured, and a compensation factor is calculated using the characteristics of a lens shading pattern of the captured white image. According to another embodiment, a distribution of pixel values is approximated using an exponential spline function, and a compensation factor is calculated using the approximated distribution. In addition, a method and an apparatus for compensating for lens shading by using a calculated compensation factor are provided according to embodiments.

In general, when an image is captured using an image capturing apparatus including a lens system and an image capturing part, the lens system causes an optical loss in the periphery thereof, and thus, a shaded area, that is, an unevenly dark area is formed at the periphery of the captured image.

Various methods are used to compensate for lens shading. For example, all pixel values of an image may be measured and be corrected using the maximum pixel value, which may require a large amount of memory according to the size of an image. Moreover, as the amount of input data increases, a processing speed decreases. Other methods also require a large amount of memory.

The amount of memory is a main factor for evaluating mobile devices such as digital cameras or cellular phones including a camera. Devices requiring a large amount of memory may cause various issues.

BRIEF SUMMARY

Embodiments provide a method and an apparatus for compensating for lens shading, which require a small amount of memory in an optical device such as a digital camera, and which improve a compensation performance.

Embodiments also provide a method and an apparatus for compensating for lens shading, which compensate for lens shading at high speed.

In one embodiment, a lens shading compensation factor calculating method includes: obtaining a reference image; dividing the reference image into division images according to channels; dividing the division image into circular sectors; determining a point having a maximum pixel value from each of the division images; determining a mean pixel value of each of the circular sectors; and calculating a compensation factor of each of the circular sectors using Equation, $$\text{Compensation factor} = (\text{maximum pixel value of each division image})/(\text{mean pixel value of sector})$$

In another embodiment, a lens shading compensation method includes: capturing an image; dividing the captured image into division images according to channels; dividing the division image into circular sectors; multiplying each of the circular sectors by a compensation factor determined according to the circular sector; and integrating the division images.

In another embodiment, a lens shading compensation apparatus may include: an image capturing device configured to obtain an image; an image capturing part performing a predetermined image processing process on the obtained image and transmitting the image; and a lens shading compensation part dividing the image transmitted from the image capturing part into division images according to color channels, dividing the division image into circular sectors, and multiplying each of circular sectors by a compensation factor determined according to the circular sector; and integrating the division images after the multiplying of the circular sectors.

In another embodiment, a lens shading compensation factor calculating method includes: obtaining a reference image; dividing the reference image into division images according to channels; determining sample pixels from each of the division images; fitting a two dimensional exponential spline function to each of the division images by using pixel values of the sample pixels; adjusting one of a coefficient and an order of the two dimensional exponential spline function to calculate a distribution of brightness values of each of the division images; and calculating a compensation factor based on the two dimensional exponential spline function.

In another embodiment, a lens shading compensation method includes: capturing an image; dividing the captured image into division images according to channels; multiplying each of the division images by a compensation factor calculated using a two dimensional exponential spline function; and integrating the division images.

In another embodiment, a lens shading compensation apparatus includes: an image capturing device configured to obtain an image; an image capturing part performing a predetermined image processing process on the obtained image and transmitting the image; and a lens shading compensation part dividing the image transmitted from the image capturing part into division images according to channels, multiplying each of the division images by a compensation factor calculated using a two dimensional exponential spline function, and integrating the division images.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments will be described with reference to the accompanying drawings.

A lens shading pattern varies according to the characteristics of an image capturing device such as a charge coupled device (CCD) sensor used in digital cameras. In a method and an apparatus for compensating for a real image according to embodiments, a white image is captured using a specific image capturing device, a compensation factor of the white image is calculated, and the real image is compensated for using the calculated compensation factor.

According to an embodiment, a method of determining a compensation factor by using a white image as a reference image will now be described. A reference image for calculating a compensation factor may be an image having uniform pixel values, that is, uniform brightness values. For example, a reference image may be a white image or a gray image.

Figure 1:
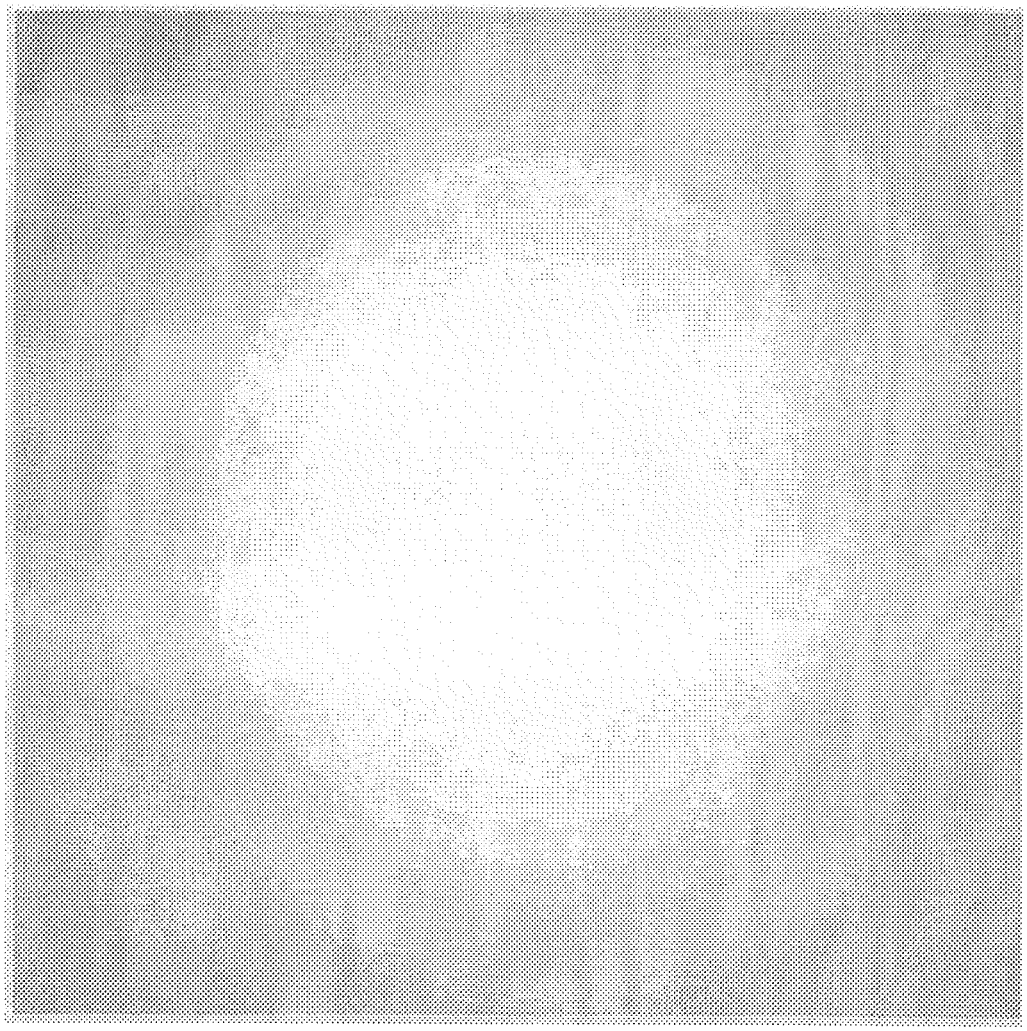
FIG. 1 is a reference image captured with a DNP viewer according to an embodiment.

Referring to FIG. 1, an image may be obtained by capturing a reference image with an optical device such as a DNP viewer (a product of Dai Nippon Printing Company) including an image capturing device for determining a compensation factor. Although an original image of the image of FIG. 1 is uniform in brightness, the image of FIG. 1 decreases in brightness from the center thereof to the periphery thereof, which is called lens shading.

Figure 2:
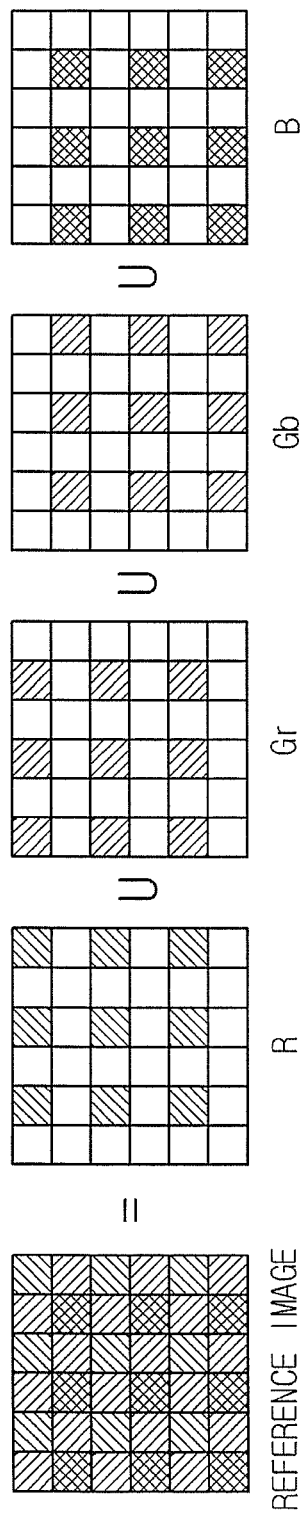
FIG. 2 is a schematic view illustrating a method of dividing a reference image into images according to color channels according to an embodiment.

Referring to FIG. 2, a reference image such as the image of FIG. 1 is divided into a plurality of images according to color channels. The reference image and the images separated according to color channels are raw data that has not been processed.

The reason why the number of the images separated according to color channels as illustrated in FIG. 2 is four is because a G channel of an image captured by a typical image capturing device has pixel values corresponding to a green red (Gr) channel and a green blue (Gb) channel. Accordingly, the number of pixels of the G channels is two times greater than that of the other channels, and thus, different lens shading compensation functions may be determined based on the Gr channel and the Gb channel, respectively.

According to an embodiment, instead of capturing a white image as illustrated in FIG. 1, several to tens of white images may be captured. Then, an average image may be calculated based on the captured white images and be used as a reference image, thereby improving the accuracy of a compensation factor.

The reference image may include an uneven part due to a noise generated from the image capturing device. In addition, the white image may include an uneven part due to a small curvature or reflection. Thus, a local filtering process may be performed on each reference image to remove noises. In this case, a median filter can be used.

After that, the compensation factor is determined according to the following two embodiments.

First Embodiment

According to a first embodiment, a method of compensating for the characteristic of the lens shading that an image decreases in brightness from the center thereof to the periphery thereof will now be described.

Figure 3:
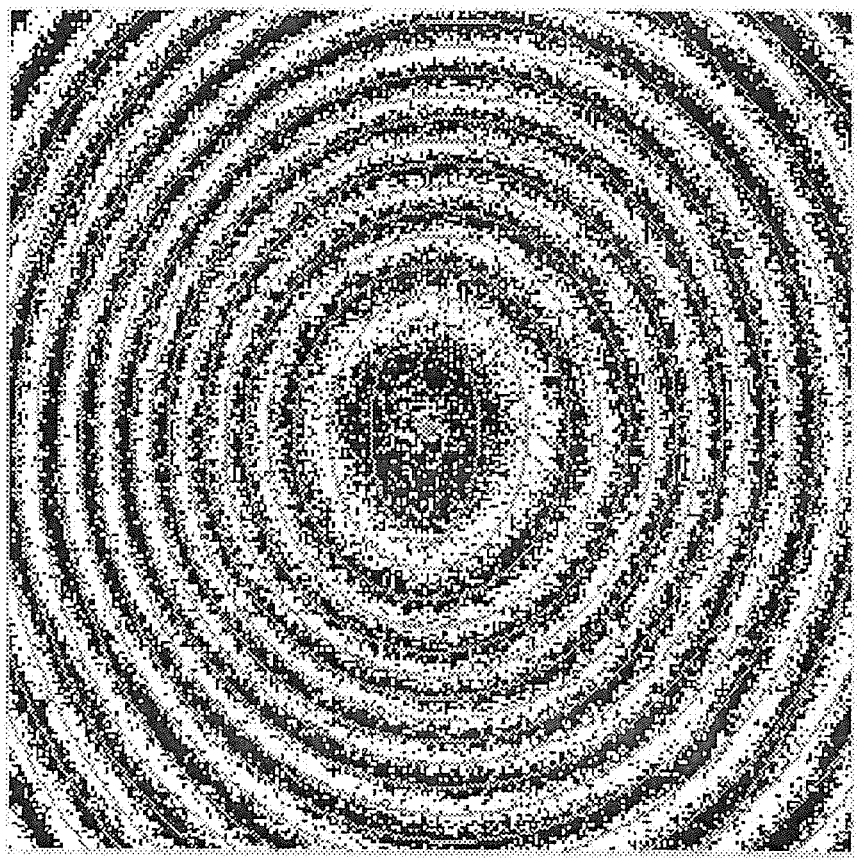
FIG. 3 is a schematic view illustrating a method of dividing a reference image into sectors in the form of a circular belt according to an embodiment.

A reference image such as the image as illustrated in FIG. 1, which decreases in brightness from the center thereof to the periphery thereof, may be divided into N sectors that have circular belt shapes with the same center and different radii, as illustrated in FIG. 3. Each sector may be a group of pixels having similar pixel values. For example, when pixel values range from 0 to 255, differences between pixel values of pixels constituting each sector may be 5 or less.

Then, the maximum one of the pixel values of the reference image, and a mean pixel value of each sector are determined. At this point, the pixel having the maximum value is located in the center of the reference image.

A compensation factor F1 of each sector having a circular belt shape may be determined using Equation 1

$$F1 = \text{(maximum pixel value of reference image)}/\text{(mean pixel value of each sector)} \quad \text{Equation 1}$$

Although the pixel having the greatest value is located in the center of the reference image, since coordinate values thereof are unknown, a process using an arithmetic unit such as a processor is difficult. In addition, at least one part of the pixel values of each sector should be measured to determine the mean pixel value of the sector. According to the embodiment, a distribution of the pixel values of the reference image may be approximated to a three-dimension curve, thereby quickly determining the mean pixel value of the sector.

Figure 4:
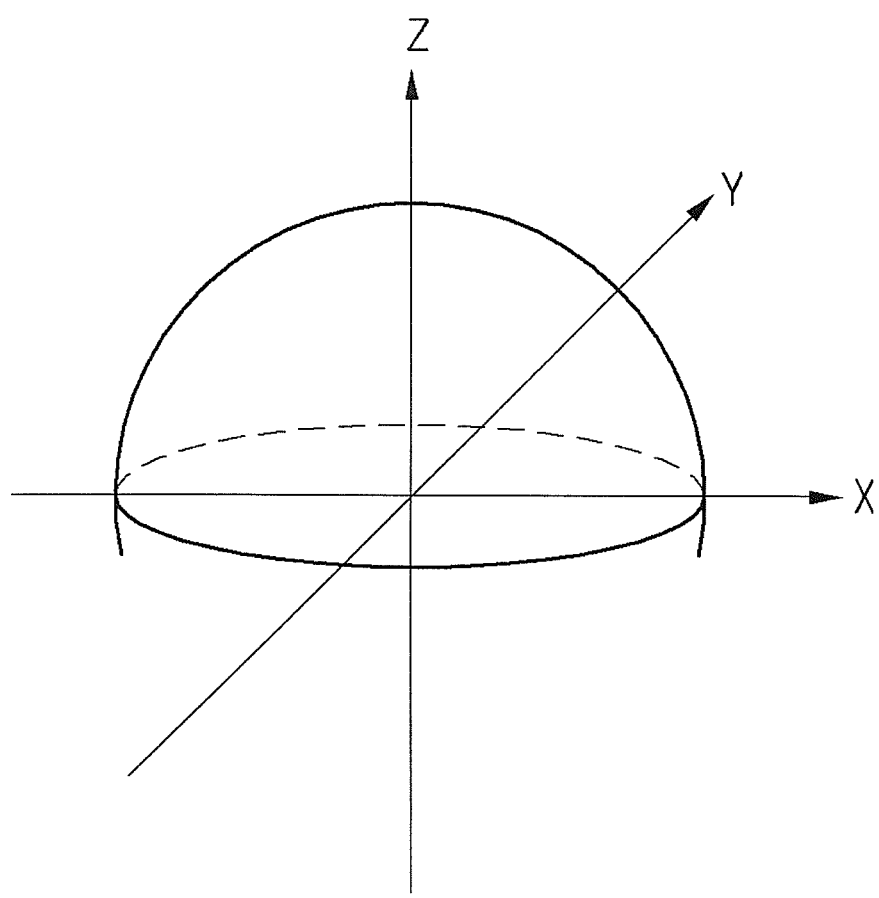
FIG. 4 is a three-dimensional graph for modeling a pixel value distribution of a reference image according to an embodiment.

The three-dimension curve may have an approximate hemisphere shape as illustrated in FIG. 4. It is assumed that the reference image is placed on an x-y plane, and a z-value denotes a brightness value of each pixel.

The hemisphere shape may be expressed using Equation 2.

$$x^2 + y^2 + z^2 + ax + by + cz + d = 0 \quad \text{Equation 2}$$

Pixel values of four or more sample pixels may be measured from the reference image, and coefficients a, b, c, and d of Equation 2 may be determined using the pixel values and the coordinate values of the sample pixels.

If the number of sample pixels is 5 or greater, the sample pixels form an overdetermined system. In this case, the distribution of the pixel values may be fitted to Equation 2 by using a least-square sphere fitting method. This is described in more detail in a work entitled "THE APPLICATIONS OF LEAST-SQUARE SPHERE FITTING IN DIGITAL CAMERA" by Shih-Ming Chen (陳世明) and Chiou-Shann Fuh (傅楸善) (Department of Computer Science and Information Engineering, National Taiwan University).

When an equation expressing a distribution of pixel values is determined, the center of a sphere corresponding to the equation is the pixel having the maximum pixel value. In addition, when a radius and a width of each sector having a circular belt shape are determined, the mean pixel value of each sector can be easily calculated using a processor.

As such, the coordinate values of the center of an image, radii of sectors having a circular belt shape, and a compensation factor of each sector are determined and stored. An optical device such as a digital camera including a lens shading compensation algorithm performs a lens shading compensation process by capturing an image, dividing the captured image into a plurality of sectors having circular belt shapes, and multiplying each of the sectors by a compensation factor corresponding to the sector.

Figure 5:
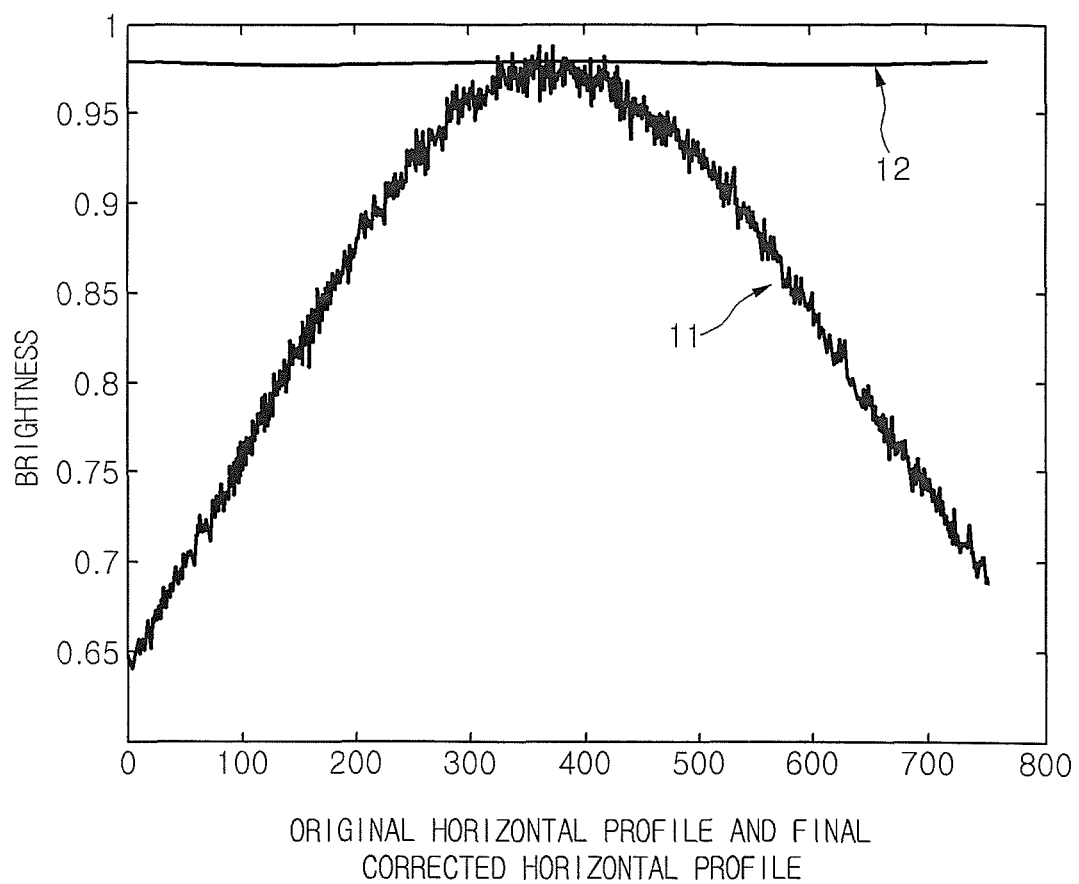
FIG. 5 is a graph illustrating compensation factors according to sectors according to an embodiment.

FIG. 5 is a graph illustrating compensation factors according to sectors according to an embodiment. The number of the sectors is thirty, and the sectors are sequentially numbered from the center of an image to the periphery thereof.

Figure 6:
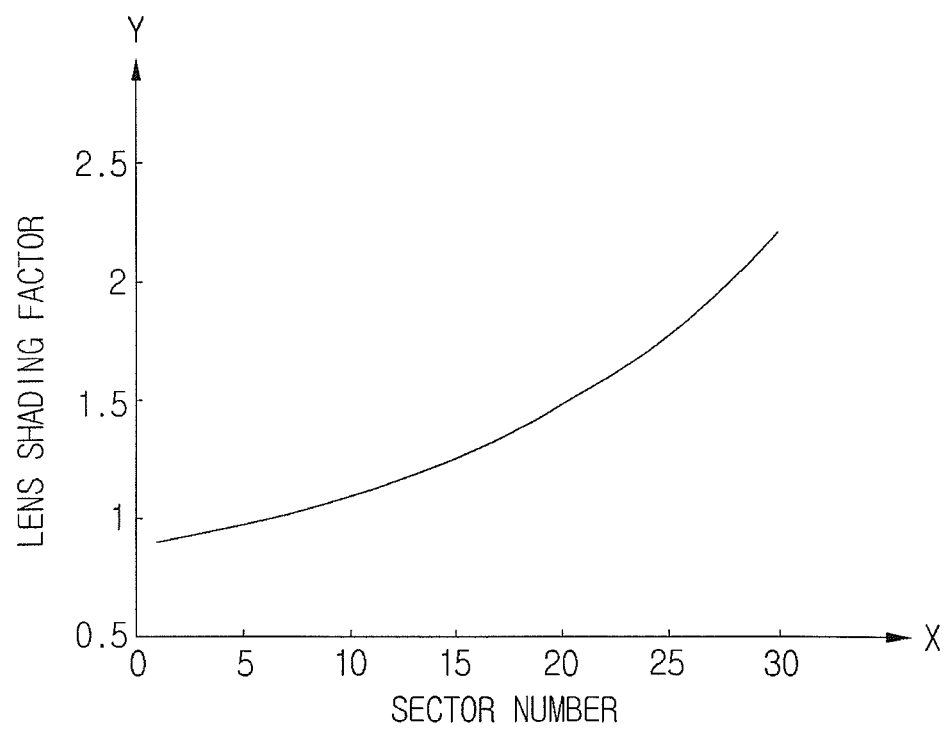
FIG. 6 is a graph illustrating a profile of a pixel value distribution taken in a horizontal direction of an original image, that is, in an x-axis direction of FIG. 4, and a corrected profile thereof.

FIG. 6 is a graph illustrating a horizontal profile in a distribution of pixel values of an original image, that is, a profile 11 taken along an x-axis of FIG. 4, and a compensation profile 12. The compensation profile 12 may be determined by multiplying the profile 11 by the compensation factors of FIG. 5. The compensation profile 12 has uniform brightness in the entire region of the image, as illustrated in FIG. 6. That is, the lens shading is substantially removed.

Figure 7:
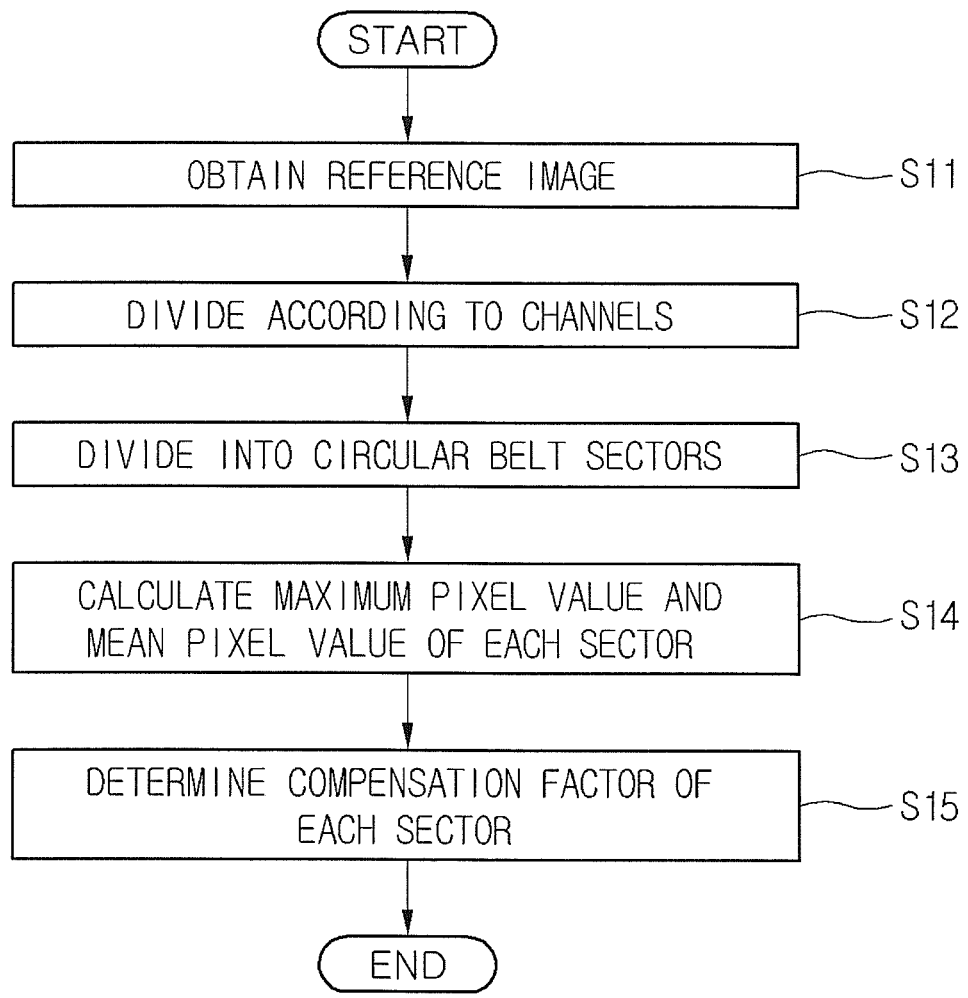
FIG. 7 is a flowchart illustrating a method of calculating a lens shading compensation factor according to a first embodiment.

FIG. 7 is a flowchart illustrating a method of calculating a lens shading compensation factor according to the first embodiment.

In operation S11, a reference image is obtained. As described above, the reference image may be obtained by capturing a white or grey image having uniform brightness, with the DNP viewer. According to another embodiment, an average image calculated based on several to tens of captured white or grey images may be used as the reference image.

In operation S12, the reference image is divided into a plurality of images according to color channels.

In operation S13, each of the images according to color channels is divided into sectors having circular belt shapes.

In operation S14, the maximum pixel value of the reference image, and a mean pixel value of each sector are calculated. At this point, as described above, sample pixels are used to fit a distribution of pixel values to a sphere equation, thereby calculating the maximum pixel value and the mean pixel value of each sector.

In operation S15, the compensation factor F1 is calculated using Equation 1.

Second Embodiment

The first embodiment is adapted to the case that a reference image decreases in brightness from the center thereof to the periphery thereof, but is not adapted to the case that pixel values are irregularly distributed. A second embodiment is adapted even to the case that a reference image is asymmetric, and pixel values are irregularly distributed. The second embodiment is different from the first embodiment after a reference image is divided into images according to color channels.

Figure 8:
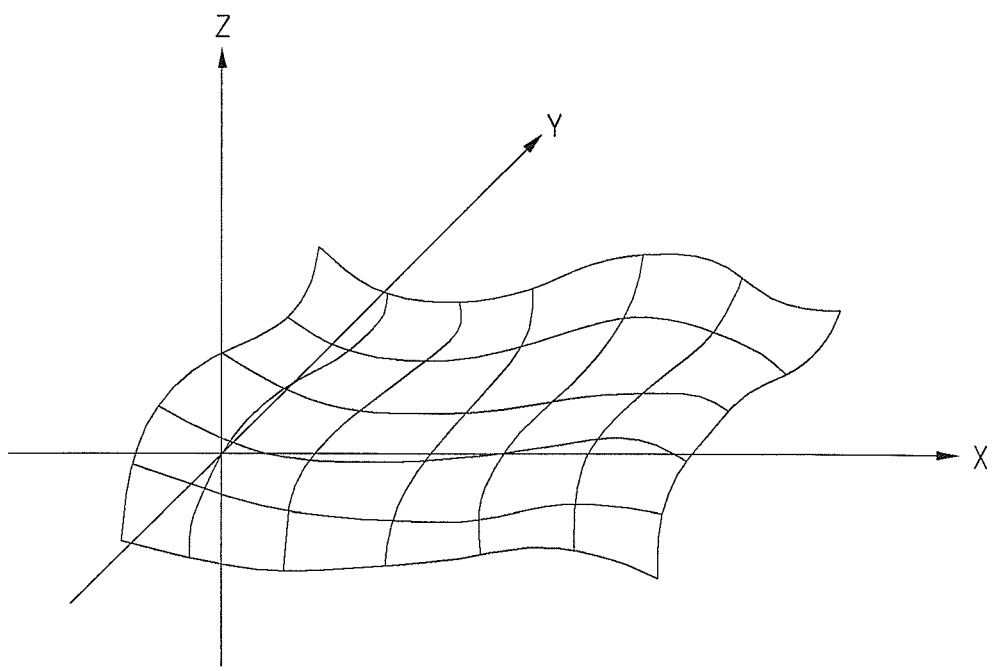
FIG. 8 is a graph illustrating an irregular pixel value distribution of a reference image according to an embodiment.

The reference image is assumed to have a distribution as illustrated in FIG. 8. Like in the FIG. 4, the reference image is placed on the x-y plane, and the z-value denotes a brightness value of each pixel. Referring to FIG. 8, the center of the reference image is not brighter than the others, and the reference image does not gradually decrease in brightness from the center thereof to the periphery thereof and has no specific pattern.

To perform a lens shading compensation process on the image having the distribution of FIG. 8, it is necessary to model the distribution with a specific equation. According to an embodiment, the specific equation may be an exponential spline function.

Figure 9:
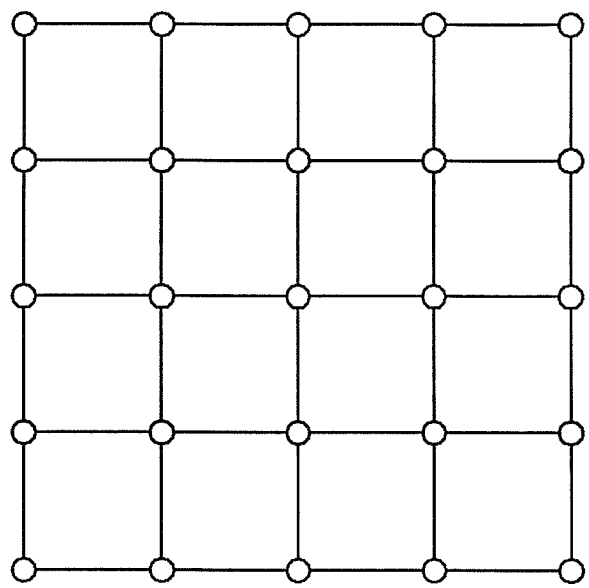
FIG. 9 is a schematic view illustrating a sample point extracting method according to an embodiment.

First, a plurality of sample points are extracted from the reference image. To this end, the reference image is divided into a plurality of rectangular sectors as illustrated in FIG. 9. The rectangular sectors may have the same size. The apexes of the rectangular sectors are extracted as sample points.

When the number of the rectangular sectors is 4×4=16 as illustrated in FIG. 9, twenty five sample points can be extracted. Pixel values corresponding to the sample points are measured.

When it is assumed that the pixel values and the coordinate values of the sample points are determined, twenty five conditions are obtained. When an equation satisfying the twenty five conditions is fitted, the distribution is modeled.

To this end, a two-dimensional equation such as Equation 3 may be used.

$$f(x, y) = \sum_{j=0}^{m} \sum_{i=0}^{n} c[i, j] Y(x-i) Y(y-j) \qquad \text{Equation 3}$$

where $Y(x)=w_1(x)*w_2(x)* \ldots *w_n(x)$, $w_i(x)=\exp(a_i x)$, $c[i, j]$ is a control point matrix, $i$, $j$, $m$, and $n$ are integers, "*" is a convolution operator, and $a_i$ is a coefficient that may be an arbitrary constant.

$Y(x)$ is an exponential spline function, and has different shapes according to orders.

Figure 10:
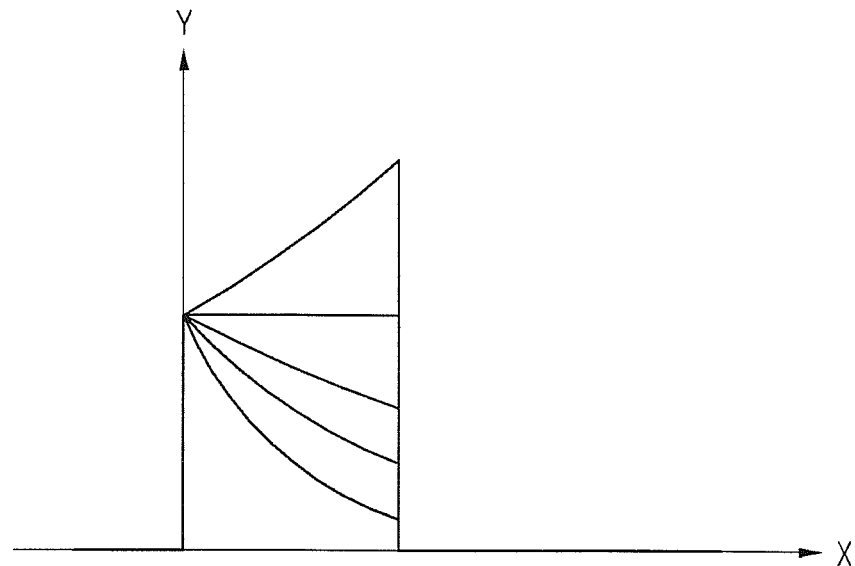
FIG. 10 is a graph illustrating a first order exponential spline function according to an embodiment.

A first order exponential spline function is $Y1=e^{a_i x}$, and has curves as illustrated in FIG. 10 with a domain [0, 1]. In this case, the curves are plotted when ai=−2, −1, −½, 0, and ½, respectively.

Figure 11:
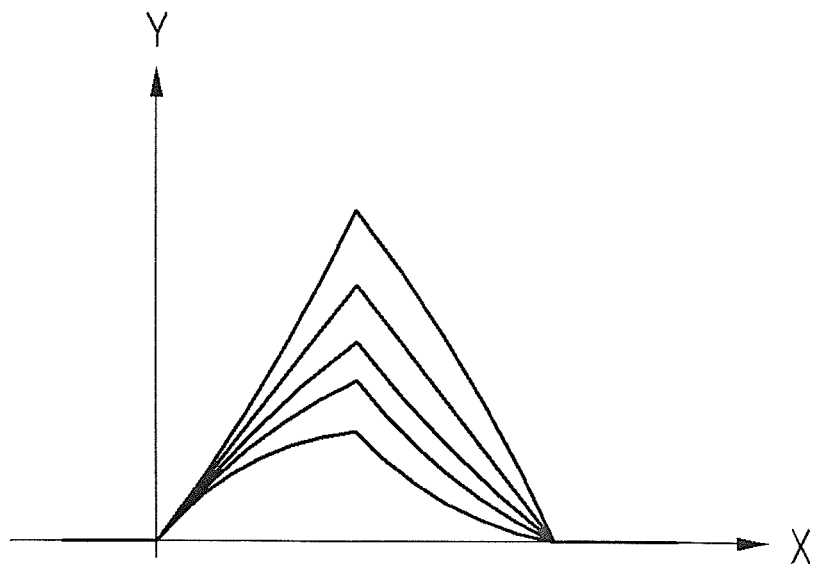
FIG. 11 is a graph illustrating a second order exponential spline function according to an embodiment.

A second order exponential spline function is $Y2=e^{a1x}*e^{a2x}$, and has curves as illustrated in FIG. 11 with a domain [0, 1]. In this case, the curves are plotted when a2=−2, −1, −½, 0, and ½, respectively, with respect to a1=0.

Figure 12:
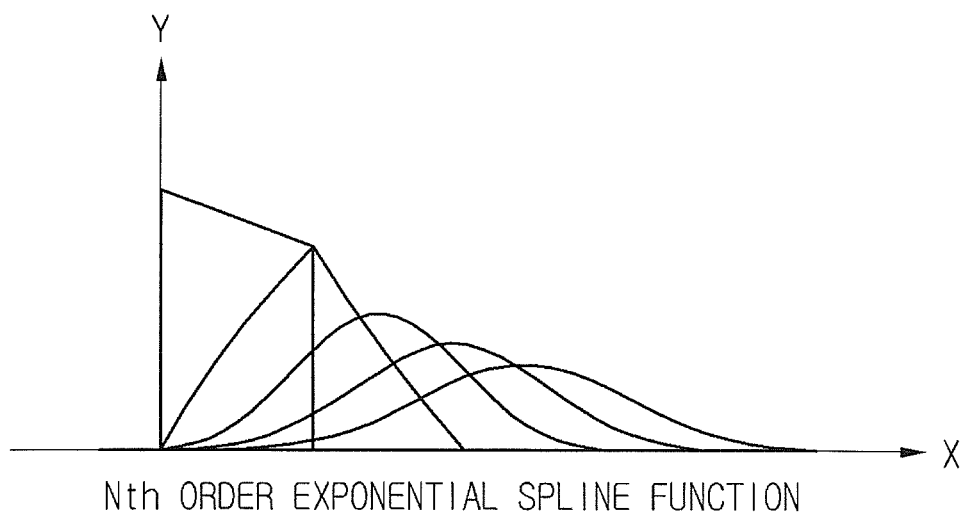
FIG. 12 is a graph illustrating an Nth order exponential spline function according to an embodiment.

An Nth order exponential spline function is $YN=w_1(x)*w_2(x)* \ldots *w_n(x)$, and has curves as illustrated in FIG. 12 according to orders with respect to ai=−¼.

An order of an exponential spline function and the coefficient ai may be selectively varied according to applications, thereby attaining optimal lens shading compensation effect. For example, a third or fourth order exponential spline function may be used.

The control point matrix [i, j] is calculated to fit Equation 3 to the distribution of the pixel values. The control point matrix c[i, j] is a 3×3 matrix, and it is assumed that the values thereof are defined using Equation 4.

$$c[i, j] = \begin{pmatrix} c00, & c01, & c02 \\ c10, & c11, & c12 \\ c20, & c21, & c22 \end{pmatrix} \quad \text{Equation 4}$$

The control point matrix c[i, j] is a 3×3 matrix in the current embodiment, but the order thereof may be varied according to embodiments.

When the values of nine components constituting the control point matrix c[i, j] are determined, Equation 3 is determined. Since the coordinate values and the pixel values of the twenty five sample points are determined, the twenty five conditions are determined. This forms an overdetermined system, and all the values of the nine components constituting the control point matrix c[i, j] are determined using the twenty five conditions.

That is, if the twenty five sample points are f(x1, y1), f(x2, y2), ..., f(x25, y25), twenty five condition equations such as Equations 5 are determined.

$$f(x1, y1) = \sum_j \sum_i c[i, j] Y(x-i) Y(y-j) \quad \text{Equation 5}$$
$$f(x2, y2) = \sum_j \sum_i c[i, j] Y(x-i) Y(y-j)$$
$$\ldots$$
$$f(x25, y25) = \sum_j \sum_i c[i, j] Y(x-i) Y(y-j)$$

The nine components constituting the control point matrix c[i, j] are determined using Equations 5, and thus, Equation 3 is determined.

That is, the irregular distribution of the pixel values can be modeled using the two-dimensional equation including the twenty five sample points and the exponential spline function as a basic function. The pixel values of all the pixels of the reference image can be determined using the determined two-dimensional equation, and then, a compensation coefficient F2 of each pixel is determined using Equation 6.

F2=(maximum pixel value)/(pixel value of each pixel))   Equation 6

The compensation coefficient F2 of each pixel is stored. Accordingly, an optical device such as a digital camera including a lens shading compensation algorithm performs a lens shading compensation process by capturing an image, and multiplying each of pixels of the captured image by the compensation factor F2.

According to an embodiment, the compensation factor F2 may be determined, then, test images may be captured and corrected, and then, an order and a coefficient of an exponential spline function may be varied according to results of the correcting of the test images to determine an optimal approximation function.

Figure 13:
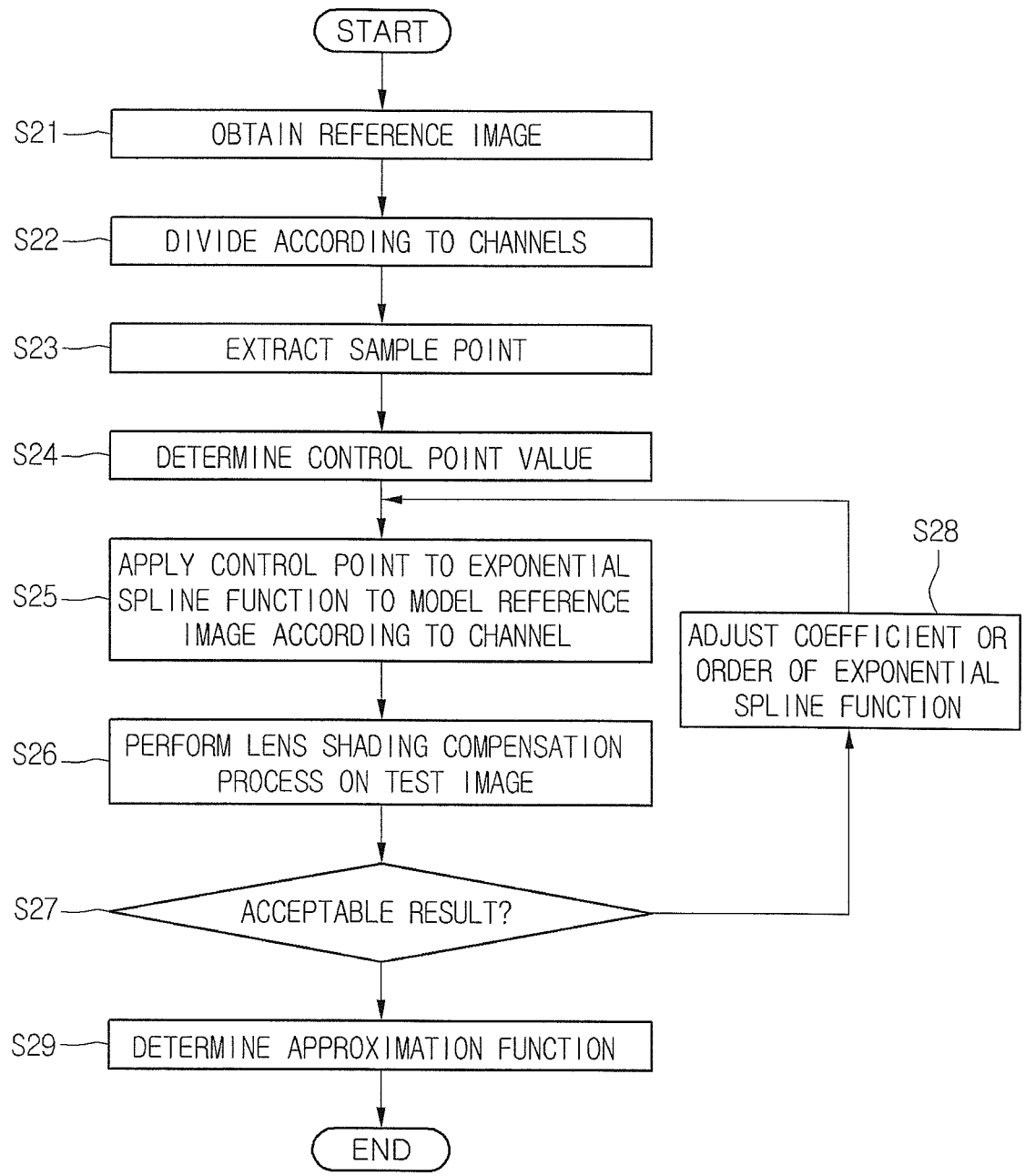
FIG. 13 is a flowchart illustrating a method of approximating a distribution of pixel values according to a second embodiment.

FIG. 13 is a flowchart illustrating a method of approximating a distribution of pixel values according to the second embodiment.

Operations S21 and S22 are the same as those of the first embodiment.

In operation S23, sample points are extracted from a reference image. For example, the reference image may be divided into rectangular sectors having the same size, and pixels corresponding to the apexes of each of the rectangular sectors may be extracted as the sample points.

In operation S24, values of control points are determined using coordinate values and pixel values of the sample points.

In operation S25, a distribution of pixel values of the reference image according to each channel is modeled using the determined values of the control points.

In operation S26, a lens shading compensation process is performed on a test image.

In operation S27, it is determined whether a result of the lens shading compensation process is acceptable. If the result is unacceptable, the order or coefficient of the exponential spline function is modified in operation S28. Then, operations S25 to S28 are repeated until a result of the lens shading compensation process is acceptable.

When an order and a coefficient for an acceptable result are determined, an approximation function is determined in operation S29.

Figure 14:
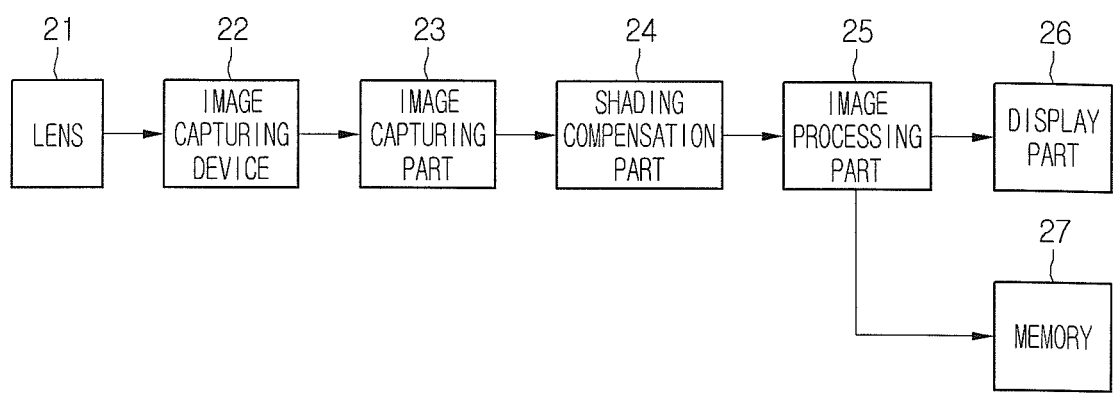
FIG. 14 is a block diagram illustrating a configuration of an image processing apparatus for performing a lens shading compensation process according to an embodiment.

FIG. 14 is a block diagram illustrating a configuration of an image processing apparatus for performing a lens shading compensation process according to an embodiment.

Referring to FIG. 14, the image processing apparatus includes: a lens 21; an image capturing device 22; an image capturing part 23 including a correlated double sampling (CDS) circuit, an automatic gain control (AGC) circuit, and an analog to digital (A/D) converter; a shading compensation part 24; an image processing part 25; a display part 26; and a memory 27.

The lens 21 transmits light (that is, an image of an object) to be incident to the image capturing device 22.

For example, the image capturing device 22 includes a photoelectric conversion device that is disposed two-dimensionally to perform a photoelectric conversion process for a charge coupled device (CCD) image or a complementary metal oxide semiconductor (C-MOS) image. Primary color filters of red (R), green (G), and blue (B) are installed in a mosaic pattern on the front surface of the image capturing device 22.

That is, the image capturing device 22 performs the photoelectric conversion process to convert an optical signal incident through the lens 21 and the color filters, to an image signal (charge), and the image signal is output to the image capturing part 23 using a raster scan method. In this case, the primary color filters may be replaced with complementary color filters of yellow (Ye), cyan (Cy), magenta (Mg), and green (G) in a mosaic pattern.

The image capturing part 23 performs an image processing process to remove a noise from the image signal output from the image capturing device 22 and to control a gain at the AGC circuit, and converts an analog signal to a digital signal at the A/D converter to supply the digital signal to the shading compensation part 24.

The shading compensation part 24 performs the lens shading compensation process by applying the compensation coefficient of the first or second embodiment to the digital signal according to sectors or pixels, and then, supplies the digital signal to the image processing part 25.

The image processing part 25 performs a gamma processing process, a color separation process, and a signal processing process such as a YUV conversion in a ratio of 4:2:2 to generate image data including brightness signal data and chroma signal data. The image processing part 25 supplies the generated image data to the display part 26 to display an image corresponding to the generated image data, or outputs the generated image data to the memory 27 to store it.

For example, the display part 26 may include a liquid crystal display (LCD) to display the image corresponding to the image data supplied from the image processing part 25. For example, the memory 27 may be a magnetic disk, an optical disk, a magneto-optical disk, or a semiconductor memory to store the image data supplied from the image processing part 25.

Components may be coupled to one another to form a single body or to operate as a single body according to the embodiment, but the present invention is not limited thereto. That is, one or more components are selectively coupled and operated within the scope of the present disclosure. Furthermore, each component may be embodied as a separate hardware, or at least one part of components may be selectively combined and be embodied as a computer program having a program module performing one or more functions in one or more types of hardware. Codes and code segments constituting the computer program can be easily construed by those skilled in the art. The computer program is stored in a computer-readable recording medium, and is read and executed by a computer, thereby accomplishing embodiments. Examples of the computer-readable recording medium may include a magnetic recording medium, an optical recording medium, and a carrier wave medium.

According to the embodiment, lens shading can be effectively compensated for with a small amount of memory in a mobile device such as a digital camera or a mobile phone including a camera.

According to the embodiment, lens shading can be compensated for more quickly.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens shading compensation factor calculating method comprising:
   obtaining a reference image;
   dividing the reference image into division images according to channels;
   dividing the division images into circular sectors;
   extracting a plurality of samples from pixels of the division images;
   fitting a distribution of pixel values of the division images to a three-dimensional sphere polynomial in an xyz space, based on the samples;
   extracting a maximum pixel value based on x and y coordinate values having a maximum z value from the three-dimensional sphere polynomial;
   determining a mean pixel value of each of the circular sectors using the three-dimensional sphere polynomial; and
   calculating a compensation factor of each of the circular sectors based on the maximum pixel value and the mean pixel value.

2. The lens shading compensation factor calculating method according to claim 1, wherein the obtaining of the reference image comprises:
   capturing a plurality of white or gray images; and
   obtaining an average image of the white or gray images.

3. The lens shading compensation factor calculating method according to claim 1, wherein the compensation factor of each of the circular sectors is calculated by using the following Equation:
   Compensation factor (maximum pixel value of each division image)/(mean pixel value of sector).

4. The lens shading compensation factor calculating method according to claim 1, further comprising smoothing an edge of a division image of the division images.

5. The lens shading compensation factor calculating method according to claim 1, wherein each of the circular sectors is a group of pixels having a difference of 5 or less in pixel value.

6. A lens shading compensation method comprising:
   capturing an image;
   dividing the captured image into division images according to channels;
   dividing the division images into circular sectors;
   multiplying each of the circular sectors by a compensation factor determined according to the circular sector; and
   integrating the division images,
   wherein the compensation factor is calculated by obtaining a reference image, dividing the reference image into division images according to channels, dividing the division images into circular sectors, extracting a plurality of samples from pixels of the division images, fitting a distribution of pixel values of the division images to a three-dimensional sphere polynomial in an xyz space, based on the samples, extracting a maximum pixel value based on x and y coordinate values having a maximum z value from the three-dimensional sphere polynomial, determining a mean pixel value of each of the circular sectors using the three-dimensional sphere polynomial, and using the maximum pixel value and the mean pixel value.

7. The lens shading compensation method according to claim 6, wherein the compensation factor is calculated by using the following Equation:
   Compensation factor=(maximum pixel value of each division image)/(mean pixel value of sector).

8. A lens shading compensation apparatus comprising:
   an image capturing device configured to obtain an image;
   an image capturing part performing a predetermined image processing process on the obtained image and transmitting the image; and
   a lens shading compensation part dividing the image transmitted from the image capturing part into division images according to color channels, dividing the division images into circular sectors, and multiplying each of circular sectors by a compensation factor determined according to the circular sector; and integrating the division images after the multiplying of the circular sectors;
   wherein the compensation factor is calculated by obtaining a reference image, dividing the reference image into division images according to channels, dividing the division images into circular sectors, extracting a plurality of samples from pixels of the division images, fitting a distribution of pixel values of the division images to a three-dimensional sphere polynomial in an xyz space, based on the samples, extracting a maximum pixel value based on x and y coordinate values having a maximum z value from the three-dimensional sphere polynomial, determining a mean pixel value of each of the circular sectors using the three-dimensional sphere polynomial, and using the maximum pixel value and the mean pixel value.

9. The lens shading compensation apparatus according to claim 8, wherein the compensation factor is calculated by using the following Equation:

Compensation factor=(maximum pixel value of each division image)/(mean pixel value of sector).

10. A lens shading compensation factor calculating method comprising:
obtaining a reference image;
dividing the reference image into division images according to channels;
determining sample pixels from each of the division images;
fitting a two dimensional exponential spline function to each of the division images by using pixel values of the sample pixels;
adjusting one of a coefficient and an order of the two dimensional exponential spline function to calculate a distribution of brightness values of each of the division images; and
calculating a compensation factor based on the two dimensional exponential spline function;
wherein the compensation factor is calculated using the following Equation:
Compensation factor=(maximum pixel value of each division image)/(pixel value of each pixel calculated from distribution of pixel values).

11. The lens shading compensation factor calculating method according to claim 10, wherein the two dimensional exponential spline function is defined by the following Equation:

$$f(x, y) = \sum_{j=0}^{m} \sum_{i=0}^{n} c[i, j] Y(x-i) Y(y-j)$$

where $Y(x)=w_1(x)*w_2(x)*\ldots*w_n(x)$, $w_i(x)=\exp(a_i x)$, $c[i, j]$ is a control point matrix, $i, j, m$, and $n$ are integers, "*" is a convolution operator, and $a_i$ is a coefficient.

12. The lens shading compensation factor calculating method according to claim 11, wherein the control point matrix is determined from the two dimensional exponential spline function, using x and y coordinate values and pixel values of the sample pixels.

13. The lens shading compensation factor calculating method according to claim 10, wherein the determining of the sample pixels comprises:
dividing each of the division images into rectangular sectors; and
determining a pixel corresponding to an apex of the rectangular sector, as the sample pixel.

14. A lens shading compensation method comprising:
capturing an image;
dividing the captured image into division images according to channels;
multiplying each of the division images by a compensation factor calculated using a two dimensional exponential spline function; and
integrating the division images;
wherein the compensation factor is calculated using the following Equation:
compensation factor=(maximum pixel value of each division image)/(pixel value of each pixel calculated from distribution of pixel values).

15. The lens shading compensation method according to claim 14, wherein the distribution of the pixel values of the reference image is calculated using the following Equation as a two dimensional exponential spline function:

$$f(x, y) = \sum_{j=0}^{m} \sum_{i=0}^{n} c[i, j] Y(x-i) Y(y-j)$$

where $Y(x)=w_1(x)*w_2(x)*\ldots*w_n(x)$, $w_i(x)=\exp(a_i x)$, $c[i, j]$ is a control point matrix, $i, j, m$, and $n$ are integers, "*" is a convolution operator, and $a_i$ is a coefficient.

16. The lens shading compensation method according to claim 15, wherein the control point matrix is determined from the two dimensional exponential spline function, using x and y coordinate values and pixel values of sample pixels obtained from the reference image.

17. A lens shading compensation apparatus comprising:
an image capturing device configured to obtain an image;
an image capturing part performing a predetermined image processing process on the obtained image and transmitting the image; and
a lens shading compensation part dividing the image transmitted from the image capturing part into division images according to channels, multiplying each of the division images by a compensation factor calculated using a two dimensional exponential spline function, and integrating the division images;
wherein the compensation factor is calculated using the following Equation:
compensation factor=(maximum pixel value of each division image)/(pixel value of each pixel calculated from distribution of pixel values).

* * * * *